United States Patent [19]

Cooper et al.

[11] 4,407,996
[45] Oct. 4, 1983

[54] STABILIZED POLYCARBONATE COMPOSITIONS

[75] Inventors: Stephen M. Cooper; Sheldon J. Shafer, both of Pittsfield, Mass.; John A. Tyrell, Mt. Vernon, Ind.

[73] Assignee: General Electric Company, Mt. Vernon, Ind.

[21] Appl. No.: 296,336

[22] Filed: Aug. 26, 1981

[51] Int. Cl.$^3$ .......................... C08K 5/41; C08L 69/00
[52] U.S. Cl. ...................................... 524/167; 524/82; 524/170; 524/171; 525/462; 525/534; 525/537
[58] Field of Search .................... 524/82, 84, 167, 170, 524/171; 525/462, 470, 534, 537

[56] References Cited

U.S. PATENT DOCUMENTS 3,546,164 12/1970 Stewart et al. ...................... 524/167
4,290,934 9/1981 Mark et al. ........................... 524/167
4,358,569 11/1982 Quinn et al. ......................... 525/534

OTHER PUBLICATIONS

Rheinboldt et al., J.A.C.S., vol. 68, 1946, pp. 973-978.
Devries et al., J.A.C.S., vol. 53, 1931, pp. 2888-2893.

Primary Examiner—John Kight, III
Assistant Examiner—R. A. White
Attorney, Agent, or Firm—Martin B. Barancik

[57] ABSTRACT

A composition comprising an aromatic carbonate polymer in admixture with an effective thermal stabilizing amount of a sulfone compound or a sulfonyl containing polymer.

7 Claims, No Drawings

STABILIZED POLYCARBONATE COMPOSITIONS

BACKGROUND OF THE INVENTION

Stabilizers of aromatic carbonate polymers have long been known in the art. Of particular interest is the concept of thermal stabilization of aromatic carbonate polymers.

Injection molding of these polymers exposes the material to high temperatures. In addition many of the utilities of the polymers require long term exposure to elevated temperatures. The integrity of the molecule should be retained for as long as possible since the physical characteristics are dependent thereon. Various chemicals such as phosphites and phosphonites have been in common usage as thermal stabilizers for aromatic carbonate polymers.

A new class of thermal stabilizers for aromatic carbonate polymers has been discovered.

SUMMARY OF THE INVENTION

In accordance with the invention there is a composition which comprises an aromatic carbonate polymer in admixture with an effective amount of (a) a thermally stabilizing compound of the formula

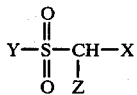

Figure 1 wherein X is hydrogen; alkyl of one to six carbon atoms inclusive; phenyl substituted alkyl of one to six carbon atoms, inclusive, the phenyl unsubstituted or substituted with one to three members of the group consisting of alkyl of one to three carbon atoms, inclusive, alkoxy of one to three carbon atoms, inclusive, chlorine and bromine; phenyl; and phenyl substituted with one to three members of the group consisting of alkyl of one to three carbon atoms, inclusive, alkoxy of one to three carbon atoms, inclusive, chlorine and bromine;

Y is alkyl of one to six carbon atoms, inclusive; phenyl substituted alkyl of one to six carbon atoms, inclusive, the phenyl unsubstituted or substituted with one to three members of the group consisting of alkyl of one to three carbon atoms, inclusive, alkoxy of one to three carbon atoms, inclusive, chlorine and bromine; phenyl; and phenyl substituted with one to three members of the group consisting of alkyl of one to three carbon atoms, inclusive, alkoxy of one to three carbon atoms, inclusive, chlorine and bromine;

Z is hydrogen; alkyl of one to six carbon atoms, inclusive; phenyl; or phenyl substituted with one to three members consisting of the group of alkyl of one to three carbon atoms, inclusive, alkoxy of one to three carbon atoms, inclusive, chlorine and bromine; and X and Y, when taken together with the atoms to which they are attached, is alkylene of three to seven carbon atoms, inclusive, unsubstituted or substituted with benzo or one to three members of the group consisting of alkyl of one to six carbon atoms, inclusive;
alkenyl of two to six carbon atoms, inclusive;
phenyl;
phenyl substituted with one to three members of the group consisting of alkyl of one to three carbon atoms, inclusive, alkoxy of one to three carbon atoms, inclusive, chlorine or bromine; or (b) a thermally stabilizing polymer containing a sulfonyl group with a C—H bond alpha to the sulfonyl group.

A preferred group is a compound of FIG. 1 where either X is phenyl or Y is benzyl.

The most preferred compound is dibenzyl sulfone.

DETAILED DESCRIPTION OF THE INVENTION

As used in this specification and claims the phrase "alkyl of one to six carbon atoms, inclusive" includes methyl, ethyl, n-propyl, n-butyl, n-pentyl, n-hexyl, and isomers thereof such as isopropyl, tert butyl, neopentyl, 2,2-dimethylbutyl and 1-1-dimethylbutyl. The phrase "phenyl substituted alkyl of one to six carbon atoms, inclusive, the phenyl unsubstituted or substituted with one to three members of the group consisting of alkyl of one to three carbon atoms, inclusive, alkoxy of one to three carbon atoms, inclusive, chlorine and bromine" includes benzyl, 1-phenethyl, 2-phenethyl, 4-phenylbutyl, 2-methyl-3-phenylpentyl, 3(o-tolyl)propyl and 4(2-chloro-4-ethoxyphenyl)butyl. The phrase "phenyl substituted with one to three members of the group consisting of alkyl of one to three carbon atoms, inclusive, chlorine and bromine" includes 2-tolyl; 2,4-dimethylphenyl o-cumyl; 2-methoxyphenyl; 2-ethoxy-3-ethylphenyl; 2,4,6-trichlorophenyl; and 2-methyl-4-propoxy-5-bromophenyl. The phrase "X and Y, when taken together with the atoms to which they are attached" includes propylene $-(CH_2)_3-$, hexylene $-(CH_2)_6-$, heptylene $-(CH_2)_7-$, and substituted molecules thereof such as

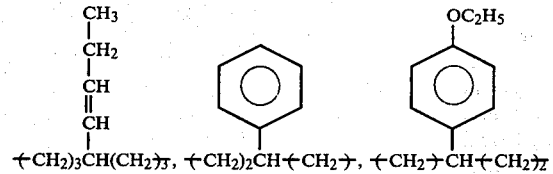

The polymer to which an effective thermal stabilizing amount of the sulfone of FIG. 1 or additive polymer is added is prepared in the conventional manner by an interfacial polymerization process or a transesterification process utilizing the phenyl esters. The process materials will be illustrated with the reactants commonly employed in the interfacial polymerization process although it is to be understood that suitable reactants can be employed in the transesterification process to provide the same aromatic carbonate polymer.

Typical of some of the dihydric phenols that may be employed in the practice of this invention are bisphenol-A, i.e., (2,2-bis(4-hydroxyphenyl)propane), (2,2-bis(4-hydroxy-3-methylphenyl)propane, 4,4-bis(4-hydroxyphenyl)heptane, 2,2-(3,5,3',5'-tetrachloro-4,4'-dihydroxydiphenyl)propane, 2,2-(3,5,3',5'-tetrabromo-4,4'-dihydroxydiphenyl)propane, (3,3'-dichloro-4,4'-dihydroxydiphenyl)methane, bis(4-hydroxy phenyl)sulfone and bis(4-hydroxy phenyl)sulfide. Other dihydric phenols of the bisphenol type are also available and are disclosed in U.S. Pat. Nos. 2,999,835; 3,028,365 and 3,334,154. Bisphenol-A is preferred.

It is, of course possible, to employ two or more different dihydric phenols or a copolymer of a dihydric phenol with a glycol or with hydroxy or acid terminated polyester, or with a dibasic acid in the event a carbonate copolymer of interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl)carbonates such as di-(chlorophenyl)carbonate, di-(bromophenyl)carbonate, di-(trichlorophenyl)carbonate, di(tribromophenyl)carbonate, etc., di-(alkylphenyl)carbonate such as di(tolyl)carbonate, etc., di-(naphthyl)carbonate, di-(chloronaphthyl)carbonate, phenyl tolyl carbonate, chlorophenyl chloronaphthyl carbonate, etc., or mixtures thereof. The haloformates suitable for use herein include bis-haloformates of dihydric phenols such as BPA and hydroquinone, or glycols (bishaloformates of ethylene glycol, neopentyl glycol, polyethylene glycol, etc.). While other carbonate precursors will occur to those skilled in the art, carbonyl chloride, also known as phosgene, is preferred.

The polymers of this invention may be prepared by employing a molecular weight regulator, an acid acceptor and a catalyst. The molecular weight regulators which can be employed in carrying out the process of this invention include monohydric phenols such as phenol, chroman-1, paratertiarybutylphenol, parabromophenol, etc. Commonly, phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor includes either a hydroxide, a carbonate, a bicarbonate, or a phosphate of an alkali or alkaline earth metal.

The catalysts which are employed herein can be any of the suitable catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethylammonium bromide, cetyl triethyl ammonium bromide, tetra-n-heptylammonium iodide, tetra-n-propyl ammonium bromide, tetramethylammonium chloride, tetramethylammonium hydroxide, tetra-n-butylammonium iodide, benzyltrimethylammonium chloride and quaternary phosphonium compounds such as, for example, n-butyltriphenyl phosphonium bromide and methyltriphenyl phosphonium bromide.

Also included herein are branched polymers wherein a polyfunctional aromatic compound is reacted with the dihydric phenol and carbonate precursor to provide a thermoplastic randomly branched polycarbonate polymer.

These polyfunctional aromatic compounds contain at least three functional groups which are carboxyl, carboxylic anhydride, haloformyl or mixtures thereof. Examples of these polyfunctional aromatic compounds which may be employed in the practice of this invention include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred polyfunctional aromatic compounds are trimellitic anhydride or trimellitic acid, or their haloformyl derivatives.

Also included herein are blends of a linear polymer and a branched polymer.

Also included within the definition of aromatic carbonate polymer are so-called copolyester carbonates. These compounds have both ester ($CO_2$) and carbonate ($CO_3$) repeating units. These compounds are generally prepared from the reaction of dihydric phenols, dicarboxylic acid precursors and a carbonate precursor.

The preferred aromatic carbonate polymers are synthesized from bisphenol-A, terephthaloyl dichloride, isophthaloyl dichloride, and phosgene.

The sulfones of FIG. 1 are made by conventional methods generally known to those of skill in the art. A significant number of the sulfones may be purchased commercially. Sulfones can in general be prepared in the following manner. The sulfide of the FIG. 1 compound is oxidized to the sulfone by conventional reagents such as hydrogen peroxide or peracids. The sulfide is often commercially available or can be prepared by reacting a YSH with

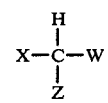

wherein W is a leaving group, generally a halogen such as chlorine.

The additive polymers useful in the invention are prepared by selective oxidation of the corresponding sulfide polymer. The polymeric sulfides are prepared in the same manner as the sulfides of the FIG. 1 compound.

Illustrative examples of sulfones which are useful as thermal stabilizers of aromatic carbonate polymers are disclosed in the Chart, attached to the specification. X, Y and Z are the same variables as in FIG. 1. Exemplification of the sulfone polymers is also indicated on the chart.

The significant aspect of the additives of the invention is that they have a C—H bond alpha to the sulfonyl group.

A thermal stabilizing effective amount of the sulfone of FIG. 1 or additive polymer is added to the aromatic carbonate polymer. A "thermal stabilizing effective amount" is a quantity of the sulfone additive or polymer which inhibits the deterioration of the aromatic carbonate polymer when it is subjected to a thermal treatment. Such deterioration is measured by conventional parameters such as a change in intrinsic viscosity (I.V.) upon heating. A control aromatic carbonate without any sulfone is employed as the comparison base. In order to be an effective amount, the quantity of sulfone or additive polymer employed should not cause significant deterioration of the aromatic carbonate polymer and should be physically compatible with it. Generally, quantities of sulfone or additive polymer of from about 0.005 to about 5 weight percent based on the quantity of aromatic carbonate polymer, preferably 0.01 to about 0.5 weight percent are appropriate.

It is preferred that the additive remain physically present during the processing of the polymer. Although the boiling point of the additive may be significantly lower than the processing temperature, the bulk of the additive may stay within the polymer during processing because of its intermingling with the polymer below the surface of the flowing material. It is important that the quantity of additive present in the polymer during and after the thermal processing produces a thermal stabilizing effect.

The sulfone or additive polymer is added to the aromatic carbonate polymer in the conventional manner, for example by co-extruding with dry resin or by adding the sulfone or additive polymer to the solution or melt.

Below are specific examples of the invention. These examples are intended to illustrate but not to limit the concept of the invention.

EXAMPLE 1

Polycarbonate prepared from BPA and diphenyl carbonate in a transesterification process, and having an intrinsic viscosity of 0.455 was aged for 16 hours at 250° C. The I.V. dropped to 0.251. Coextrusion of this polycarbonate with 0.07% dibenzyl sulfone gave a stabilized polycarbonate of 0.453 I.V. After aging for 16 hours at 250° C. the I.V. was 0.432.

EXAMPLE 2

Polycarbonate prepared from BPA and phosgene in an interfacial process had an initial I.V. of 0.450. After extrusion and aging as in Example 1, and I.V. of 0.435 was obtained whereas the same polycarbonate with 0.07% dibenzyl sulfone had an aged I.V. of 0.470.

EXAMPLE 3

In like manner as in Examples 1 and 2, appropriate quantities of phenyl benzyl sulfone, benzyl ethyl sulfone, p-tolylbenzyl sulfone, di-butyl sulfone and benzyl sulfone polymer are added to the aromatic carbonate polymer and similar results are obtained.

EXAMPLE 4

Polycarbonate prepared from BPA and diphenyl carbonate in a transesterification process, and having an intrinsic viscosity of 0.455 was aged for 16 hours at 250° C. The I.V. dropped to 0.251. Coextrusion of this polycarbonate with 0.07% diphenyl sulfone followed by aging for 16 hours at 250° C. showed no appreciable stabilization by physical observation.

CHART

| X | Y | Z |
|---|---|---|
| phenyl | benzyl | hydrogen |
| hydrogen | methyl | ethyl |
| n-propyl | n-butyl | phenyl |
| hydrogen | t-butyl | n-hexyl |
| phenyl | methyl | hydrogen |
| 3-chlorophenyl | isobutyl | 2-chlorophenyl |
| 4-ethylphenyl | 1-phenethyl | isobutyl |
| 2,5-dimethylphenyl | i-propyl | hydrogen |
| 3,4-dimethoxybenzyl | n-hexyl | methyl |
| 2-bromophenyl | benzyl | hydrogen |
| 2-bromo-4,5-dimethylphenyl | ethyl | phenyl |

-continued
CHART

| X | Y | Z |
|---|---|---|

(cyclic structure with S(=O)₂ and C-H, with X, Y, Z substituents)

XY
$+CH_2+_n$
$+CH_2+_n$ $-CH_2-C(\phi)(\phi)-C-CH_2-$ $+CH_2+_n CH(CH_2)_2$ with $C_2H_5$ substituent $+CH_2+_n C(\phi)(H)-CH_2-$ Polymers containing a sulfonyl group $\langle\bigcirc\rangle-CH_2-SO_2-CH_2+\langle\bigcirc\rangle-CH_2SO_2-CH_2+_n\langle\bigcirc\rangle$ $+C(H)(\phi)-C(H)(H)+_x+C(H)(\phi)-C(H)(H)+_y$ with $CH_2SO_2\langle\bigcirc\rangle$ $+O-\langle\bigcirc\rangle-C(CH_3)_2-\langle\bigcirc\rangle-O-C(=O)+_x+O-\langle\bigcirc\rangle-C(CH_3)_2-\langle\bigcirc\rangle-O-C(=O)+_y$ with $CH_2SO_2\langle\bigcirc\rangle$ wherein n, X and Y are of sufficient magnitude to make a polymer.

What is claimed is:

1. A composition which comprises an aromatic carbonate polymer in admixture with an effective amount of a stabilizer of the group consisting of
   (a) thermally stabilizing compound of the formula $$Y-\underset{\underset{O}{\overset{\overset{O}{\|}}{S}}}{\|}-\underset{Z}{\overset{X}{C}H}-$$

Figure 1 wherein
X is phenyl or phenyl substituted with one to three members of the group consisting of alkyl of one to three carbon atoms, inclusive, alkoxy of one to three carbon atoms, inclusive, chlorine and bromine;

Y is alkyl of one to six carbon atoms, inclusive; phenyl substituted alkyl of one to six carbon atoms, inclusive, the phenyl unsubstituted or substituted with one to three members of the group consisting of alkyl of one to three carbon atoms, inclusive, alkoxy of one to three carbon atoms, inclusive, chlorine and bromine; phenyl; and phenyl substituted with one to three members of the group consisting of alkyl of one to three carbon atoms, inclusive, alkoxy of one to three carbon atoms, inclusive, chlorine and bromine;

Z is hydrogen; alkyl of one to six carbon atoms, inclusive; phenyl; or phenyl substituted with one to three members consisting of the group of alkyl of one to three carbon atoms, inclusive, alkoxy of one to three carbon atoms, inclusive, chlorine and bromine;

(b) a thermally stabilizing polymer having as a repeating unit a sulfonyl group with a C—H bond alpha to the sulfonyl group and a phenyl is attached to the said C—H bond.

2. A composition in accordance with claim 1 wherein the stabilizer is a compound of FIG. 1 and Y is benzyl.

3. A composition in accordance with claims 1 or 2 wherein the compound is present in the admixture in quantities of from about 0.005 to about 5 weight percent of the aromatic carbonate polymer.

4. A composition in accordance with claims 1 or 2 wherein the compound is present in the admixture in quantities of from about 0.01 to about 0.5 weight percent of the aromatic carbonate polymer.

5. A composition in accordance with claim 1 wherein the compound or polymer is present in the admixture in quantities of from about 0.005 to about 5 weight percent of the aromatic carbonate polymer.

6. A composition in accordance with claim 1 wherein the compound or polymer is present in the admixture in quantities of from about 0.01 to about 0.5 weight percent of the aromatic carbonate polymer.

7. A composition in accordance with claim 1 wherein the aromatic carbonate polymer is derived from bisphenol-A and a carbonate precursor.

* * * * *